(12) United States Patent
Stiner et al.

(10) Patent No.: US 7,467,062 B2
(45) Date of Patent: *Dec. 16, 2008

(54) REEL MECHANISM WITH ENVIRONMENTAL AND FISH WEIGHING SENSORS

(75) Inventors: Roy E. Stiner, Owasso, OK (US); Randy A. Atherton, Tulsa, OK (US); Micah Jones, Tulsa, OK (US); Curtis Schmidt, Tulsa, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 795 days.

This patent is subject to a terminal disclaimer.

(21) Appl. No.: 10/988,167

(22) Filed: Nov. 12, 2004

(65) Prior Publication Data

US 2005/0161543 A1 Jul. 28, 2005

Related U.S. Application Data

(63) Continuation-in-part of application No. 10/614,695, filed on Jul. 7, 2003, now abandoned, which is a continuation of application No. 09/843,525, filed on Apr. 27, 2001, now Pat. No. 6,591,222.

(51) Int. Cl.
G06F 15/00 (2006.01)
(52) U.S. Cl. .................. 702/173; 702/138; 702/130
(58) Field of Classification Search .......... 702/130, 702/138, 173; 43/21; 73/862.391; 242/370
See application file for complete search history.

(56) References Cited

U.S. PATENT DOCUMENTS

| | | | |
|---|---|---|---|
| 3,246,859 A | 4/1966 | Martin | 242/84.54 |
| 4,422,258 A | 12/1983 | Adams et al. | 43/17 |
| 4,516,348 A | 5/1985 | Hirose et al. | 43/17 |
| 4,552,318 A | 11/1985 | Durham | 242/84.1 |
| 4,650,161 A | 3/1987 | Kaneko | 242/84.5 |
| 4,660,666 A * | 4/1987 | Reder et al. | 177/148 |
| 4,693,125 A * | 9/1987 | Krutz et al. | 73/862.391 |
| 4,840,327 A | 6/1989 | Kaneko | 242/217 |
| 4,842,085 A * | 6/1989 | Lang | 177/164 |
| 5,219,131 A | 6/1993 | Furomoto | 242/223 |
| 5,243,147 A | 9/1993 | Johnson | 177/245 |
| 5,321,903 A | 6/1994 | Ebener | 43/17 |
| 5,479,831 A | 1/1996 | Hirose | 73/862.44 |
| 5,560,560 A | 10/1996 | Hirose | 242/223 |
| 5,639,038 A | 6/1997 | Hirose | 242/223 |

(Continued)

FOREIGN PATENT DOCUMENTS

DE 3644165 A1 7/1988

(Continued)

*Primary Examiner*—Edward R Cosimano
*Assistant Examiner*—Douglas N Washburn
(74) *Attorney, Agent, or Firm*—Fellers, Snider, Blankenship, Bailey & Tippens

(57) ABSTRACT

A fishing reel with an integrated barometer sensor, a temperature sensor, and a weight sensor forming a sensorized fishing reel to enhance the fishing experience of an angler is disclosed. The sensorized fishing reel includes; an exterior housing supporting a display and enclosing the barometer sensor, the temperature sensor, the weight sensor as well as a controller. The controller selectively interacts with each sensor to obtain sensory readings provided by each sensor, and delivers the obtained sensory readings to the angler via the display.

16 Claims, 5 Drawing Sheets

U.S. PATENT DOCUMENTS

| | | |
|---|---|---|
| 5,782,033 A | 7/1998 | Park et al. .................. 43/4 |
| 5,833,156 A | 11/1998 | Park et al. .................. 242/289 |
| 5,894,691 A | 4/1999 | Zepeda, Sr. .................. 43/17 |
| 6,126,103 A | 10/2000 | Nanbu .................. 242/223 |
| 6,312,335 B1 | 11/2001 | Tosaki et al. .................. 463/37 |
| 6,591,222 B2 * | 7/2003 | Stiner .................. 702/173 |
| 7,225,102 B2 | 5/2007 | Stiner et al. |
| 2004/0056131 A1 | 3/2004 | Stiner et al. .................. 242/223 |

FOREIGN PATENT DOCUMENTS

| | | |
|---|---|---|
| JP | 05030883 A | 2/1993 |
| JP | 05161438 A | 6/1993 |
| JP | 05184271 A | 7/1993 |

\* cited by examiner

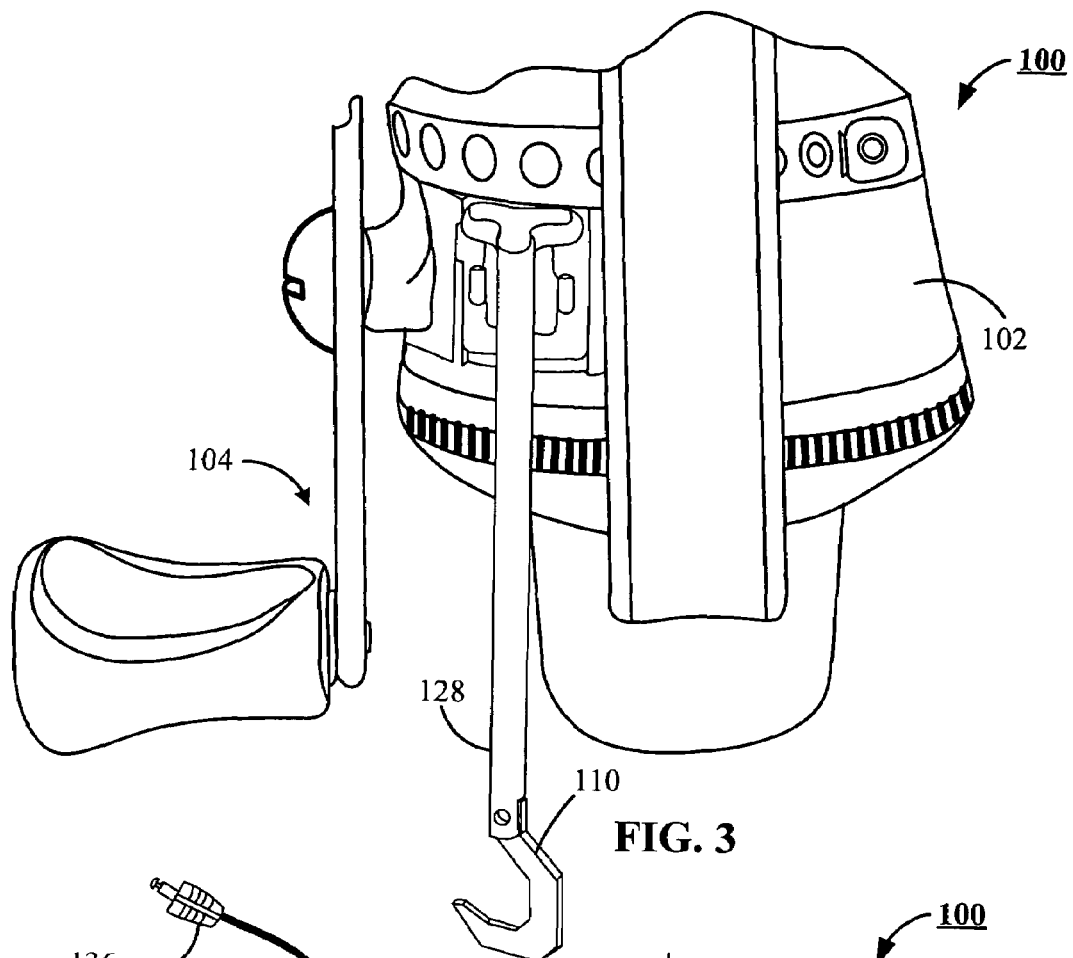
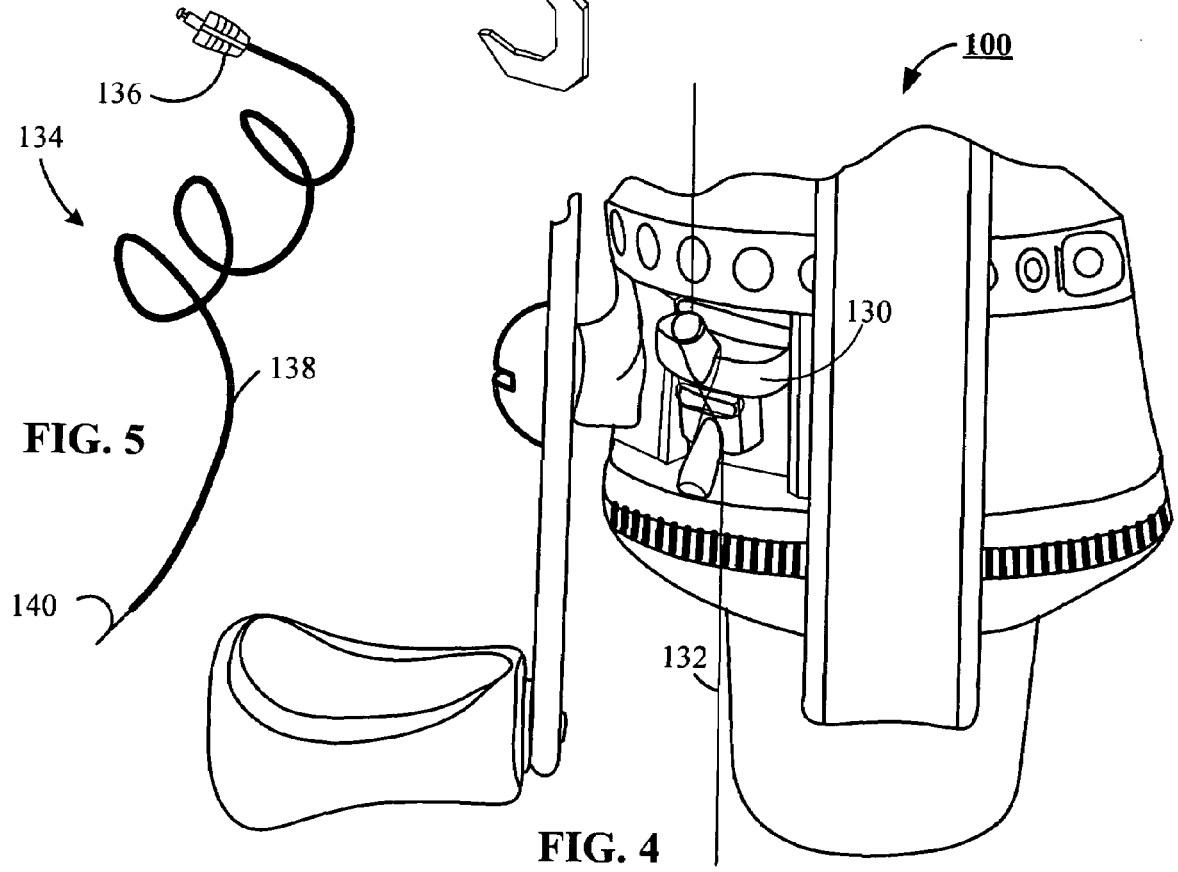

REEL MECHANISM WITH ENVIRONMENTAL AND FISH WEIGHING SENSORS

CROSS REFERENCE TO RELATED APPLICATION

This application is a continuation-in-part (CIP) of and claims the benefit of U.S. patent application Ser. No. 10/614,695 entitled REEL MECHANISM WITH LINE TENSION/FISH WEIGHT INDICATOR filed Jul. 7, 2003 now abandoned which is a continuation of U.S. patent application Ser. No. 09/843,525 entitled REEL MECHANISM WITH LINE TENSION/FISH WEIGHT INDICATOR filed Apr. 27, 2001 which issued into U.S. Pat. No. 6,591,222 on Jul. 8, 2003.

BACKGROUND OF THE INVENTION

1. Field of the Invention

This invention relates generally to a fishing reel. More particularly, but not by way of limitation, the present invention relates to a fishing reel, which incorporates at least an apparatus for sensing barometric pressure, temperature, weight of an object, and a display device to selectively present a measurement indicative of: barometric pressure; or temperature of, for example, a body of water; or weight of, for example, of a landed fish.

2. Background

Fishing reels for sport fishing are known in the art and are available in a variety of styles such as bait casting reels, spin casting reels, spinning reels, fly fishing reels, etc. Such reels are available with a wide variety of features which enhance the fishing experience. For example, most reels provide an adjustable drag mechanism whereby an angler may set a force level so that the reel will resist forces below the drag force but will allow fishing line to payout when forces exceeding the drag force are encountered. Thus reducing the likelihood that a large fish will break the fishing line or damage the reel.

Generally speaking, it would be desirable for a fisherman to determine specific environmental conditions, and of potentially greater importance, changes in environmental conditions over time or location, which may affect the fishing strategy employed by the fisherman, and to determine the weight of a landed fish without having to carry additional sensory devices.

For example, it is not necessarily known why fish feed more during times of changing barometric pressure. However, experienced fishermen have reported that more fish were caught when the barometric pressure was relatively steady (but typically not above 30.40 inches or so), rising steadily, or fluctuating rapidly (such as when rain storms come and go). Reportedly, when a weather front is approaching (falling barometer), fish are not as likely to bite. The same thing is true when a weather front is clearing, but not as drastic. But immediately following the passing of the front, as the barometer rises, the fish feed very aggressively and will continue to feed until the barometer begins to fall.

Standalone measurement devices such as fish scales, hand held barometers, and temperature measure devices are known in the art. However, market pressures continue to push for competitive products that enhance the fishing experience of anglers in a more efficient and ergonomically convenient manner. Minimizing the number of auxiliary devices carried by an angler, and minimizing the encroachment into the angler's fishing time needed for operating those auxiliary devices is likely to enhance the angler's fishing experience. As such, challenges remain and a need persists for improvements in devices and methods for collecting and displaying data pertinent to anglers for promoting successful fishing experiences, to which the present invention is directed.

SUMMARY OF THE INVENTION

The present invention preferable provides a sensorized fishing reel including, an exterior housing supporting a display and enclosing an electronic scale as well as a controller. The electronic scale communicates with the controller to determining a weight of a fish, and the controller communicates with the display to reveal the determined weight of said fish.

In a preferred embodiment, the sensorized fishing reel further includes a barometric pressure measuring circuit and a temperature measurement circuit each enclosed by the exterior housing and each communicating with the controller. The barometric pressure measuring circuit acquires barometric pressure readings at a predetermined acquisition rate, the temperature measurement circuit acquires temperature readings at a directed rate, and the controller determines respective barometric pressure values and temperature values for presentation to an angler on the display.

Acquisition of the temperature readings is provided by an attachable thermal-couple that includes at least: a thermal-couple input jack at a proximal end; and a thermal probe at a distal end. The thermal-couple input jack engages a thermal-couple input receptacle supported by the exterior housing and electrically linked to the temperature measurement circuit, and the thermal probe: senses a temperature of an environment; generates a signal indicative of the temperature of that environment; and provides the signal to the temperature measurement circuit.

In another preferred embodiment, a thermal-couple input jack of a thermal-couple is inserted into a thermal-couple receptacle provided by a sensorized fishing reel; a thermal probe portion of the thermal-couple is inserted into a fluid; a signal indicative of a temperature of the fluid is generated by the thermal probe portion; the signal is converted into a temperature value by a controller confined within an exterior housing of the sensorized fishing reel and communicates with the thermal-couple receptacle; and the generated temperature value is stored by the controller in a memory portion of the controller.

These and various other features and advantages, which characterize the present invention, will be apparent from a reading of the following detailed description and a review of the associated drawings.

BRIEF DESCRIPTION OF THE DRAWINGS

FIG. 3 provides a partial cutaway back side elevational view of an alternate preferred embodiment of the inventive fishing reel of FIG. 1.

FIG. 4 provides an elevational view of a thermal-couple attachment of the inventive fishing reel of FIG. 1.

FIG. 5 provides a partial cutaway back side elevational view of an additional alternate preferred embodiment of the inventive fishing reel of FIG. 1.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. Additionally, the term "sensorized fishing reel" as used herein below shall mean: a fishing reel, preferably for sport fishing, which includes integrated sensory devices and supporting electronics for collecting and displaying data pertinent to anglers, such as barometric pressure, water temperature, and weight of a fish. While the term "landed fish," as used herein below shall have the meaning of: a fish extracted from a body of water and under complete control of an angler.

Figure 1:
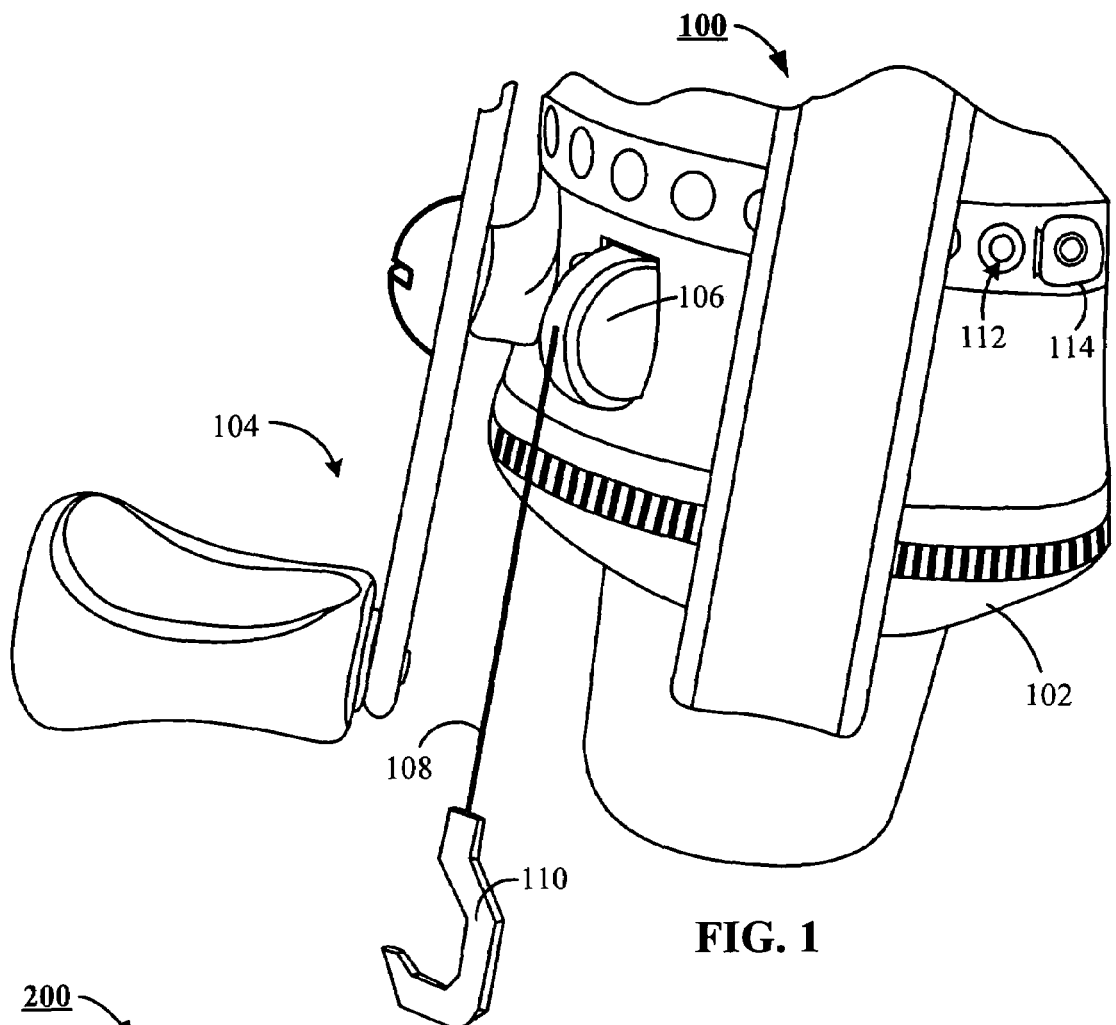
FIG. 1 provides a partial cutaway back side perspective view of a preferred embodiment of the present inventive fishing reel.
Figure 2:
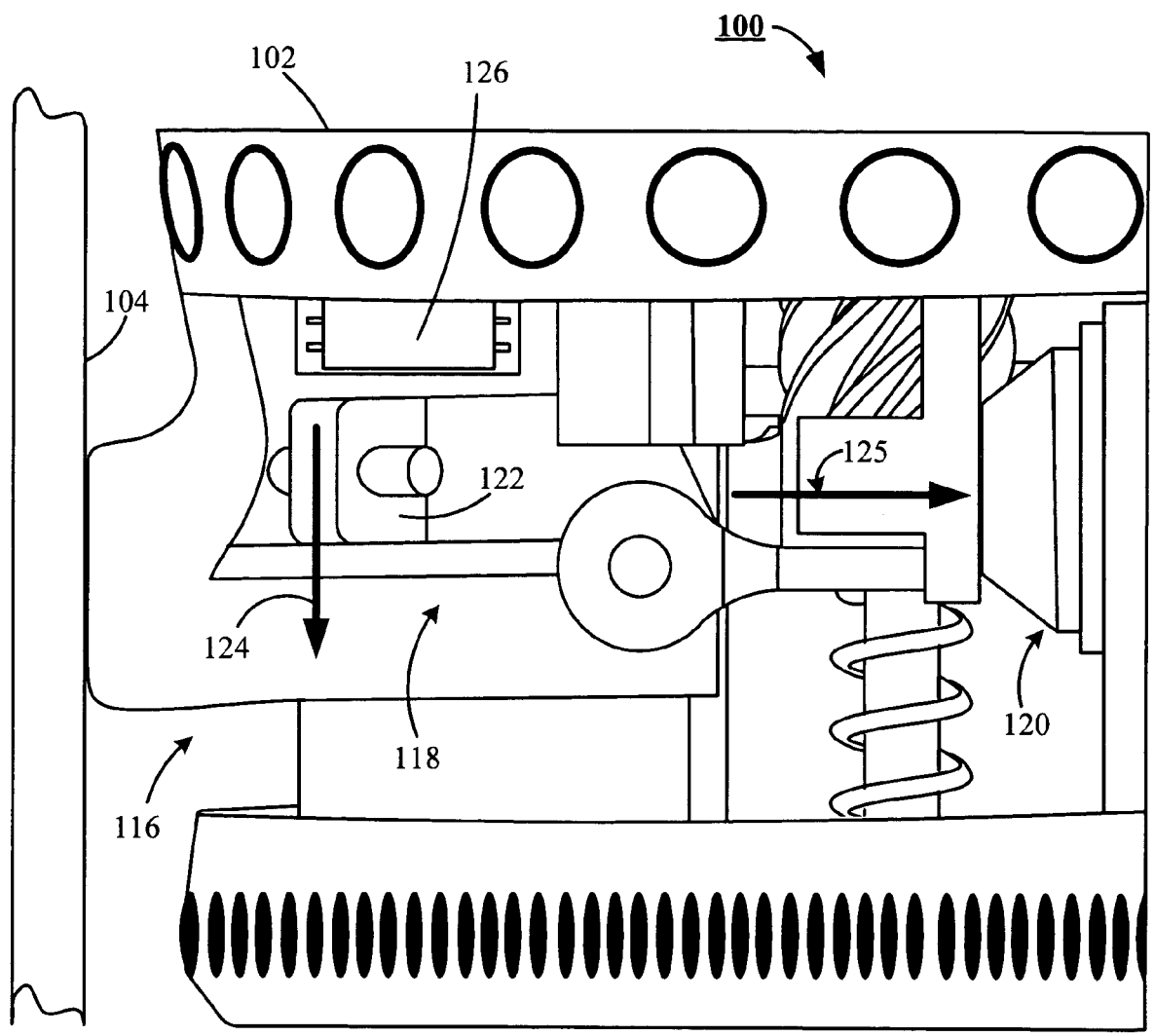
FIG. 2 provides a partial cutaway back side elevational view of the preferred embodiment of the inventive fishing reel of FIG. 1.

Referring now to the drawings, wherein like reference numerals indicate the same parts throughout the several views, a preferred embodiment of the inventive sensorized fishing reel 100 with a mechanism to measure a weight of a fish is shown in FIGS. 1 and 2. FIG. 1 shows the sensorized fishing reel 100 which includes: an exterior housing 102; a crank handle 104 located adjacent the exterior housing 102 for rewinding fishing line; a weight suspension portion, such as a coil spring mechanism 106, of a force transfer mechanism adjacent the crank handle 104. In a preferred embodiment, the coil spring mechanism 106 provides a retractable weigh line 108 supporting a weigh hook 110 for weighing landed fish. During a weighing process of a landed fish, compensation for an amount of force needed to uncoil and suspend the retractable weigh line 108 with the weigh hook 110 from the sensorized fishing reel 100 is made by a fish weighing portion of a control program executed by a controller (shown in FIG. 7), which is enclosed within the exterior housing 102.

The sensorized fishing reel 100 shown by FIG. 1 further includes a thermal-couple input receptacle 112 supported by the exterior housing 102, the thermal-couple input receptacle 112 cooperates with a thermal-couple (shown by FIG. 5) to provide a temperature measurement circuit (shown in FIG. 7), a signal indicative of a temperature of a fluid of interest, such as the temperature of a portion of a lake; and a thermal-couple input receptacle cover 114 supported by the exterior housing 102, and hinged adjacent the thermal-couple input receptacle 112. The thermal-couple input receptacle cover 114 seals the thermal-couple input receptacle 112 from exposure to the elements, when the thermal-couple input receptacle 112 is in nonuse.

FIG. 2 shows that a preferred embodiment of the sensorized fishing reel 100 further includes an electronic scale 116. The electronic scale 116 includes a force transfer mechanism 118 that interacts with a force sensor 120. Preferably, the force transfer mechanism 118 includes a coupling 122, which interacts with the weight suspension portion (such as the coil spring mechanism 106 of FIG. 1), to transfer the force encountered in a first direction (shown by a force vector 124) by a suspended landed fish, into an induced force applied in a second direction (shown by a force vector 125) and applied to the force sensor 120. FIG. 2 further reveals a barometric pressure measurement circuit 126 (to be disclosed in greater detail during the discussion of FIG. 7) secured within the exterior housing 102.

FIG. 3 illustrates an alternate preferred embodiment of the sensorized fishing reel 100. In the illustrated alternate preferred embodiment of FIG. 3, the weight suspension portion of the force transfer mechanism 118 takes the form of a detachable ridged post 128, which supports the weigh hook 110. Empirical data has shown that the use of the ridged post 128 and the weigh hook 110 combination improves the repeatability of a measured weight when compared to the repeatability of a measured weight obtained through use of another alternate embodiment shown by FIG. 4, as discussed in greater detail below.

FIG. 4 depicts another alternate preferred embodiment of the sensorized fishing reel 100. In the embodiment of FIG. 4, the weight suspension portion of the force transfer mechanism 118 takes the form of a cleat 130. Rather than an angler having to suspend a landed fish from the weigh hook 110, of either the embodiment of FIG. 1 or FIG. 3, the angler merely wraps the fishing line 132 around the cleat 130, which suspends the fish from the cleat 130 by the fishing line 132. It is noted however, that use of a loop of the fishing line 132 around the cleat 130 allows the angler to adjust the angle at which the weight of the fish addresses the force transfer mechanism 118, which could result in an inaccurate weight measurement. Use of the ridged post 128, of FIG. 3, prevent this change in angle, thereby improving the repeatability of the measured weight of the fish.

Preferably, the force sensor 120 of FIG. 2, incorporates a component such as a force sense resister, which provides a change in resistance in response to a compressive load; or a piezoelectric load cell, which upon sensing a compressive load, provides a voltage output. The response output of the force sensor 120 is initially used to commence the landed fish weighing process, which will be covered in greater detail during the discussion of FIG. 7.

FIG. 5 shows a thermal-couple 134 that included at least a thermal-couple input jack 136 at a proximal end of a conductor 138, and a thermal probe 140 at a distal end of the conductor 138. The thermal-couple input jack 136 communicates with the thermal-couple input receptacle 112 of FIG. 1, while the thermal probe 140 communicates with a fluid, preferably a body of water of interest to an angler, during a fluid temperature measurement process. In a preferred embodiment, the conductor 138 of the thermal-couple 134 is sized to accommodate an anglers desire to acquire temperature readings at various depths of the body of water of interest.

Figure 6:
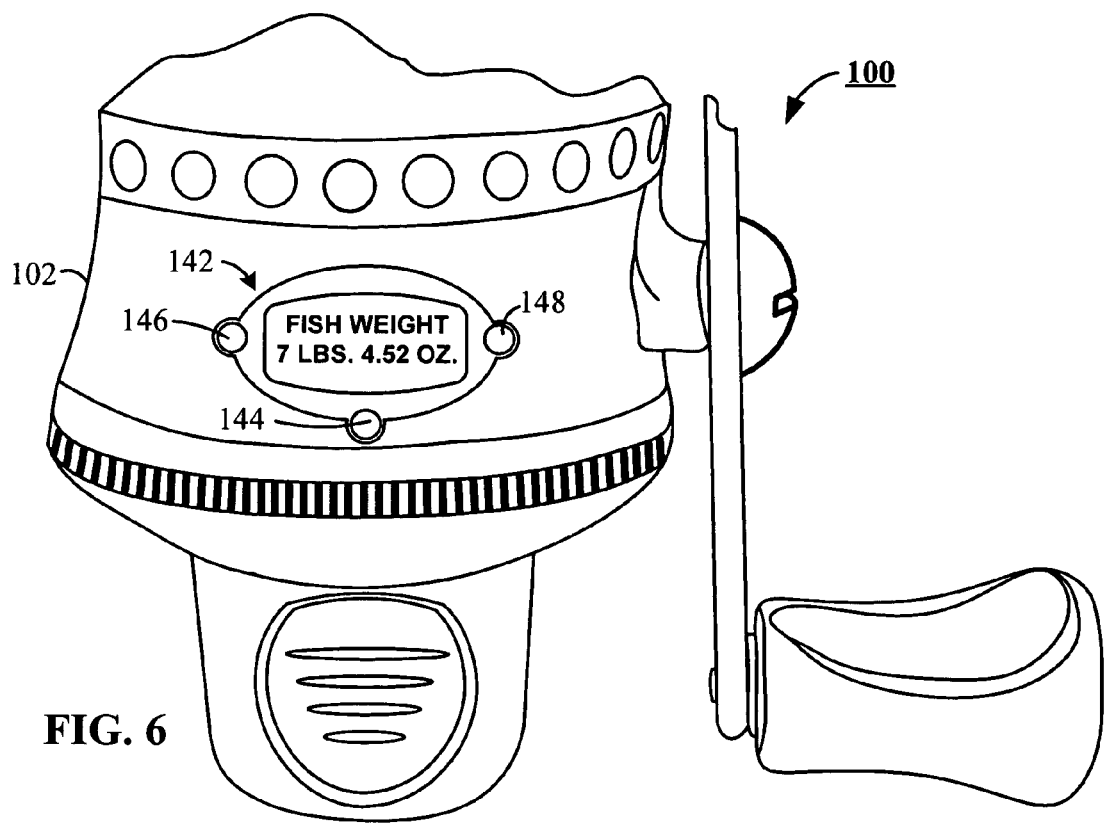
FIG. 6 provides a partial cutaway front side elevational view of the inventive fishing reel of FIG. 1.
Figure 7:
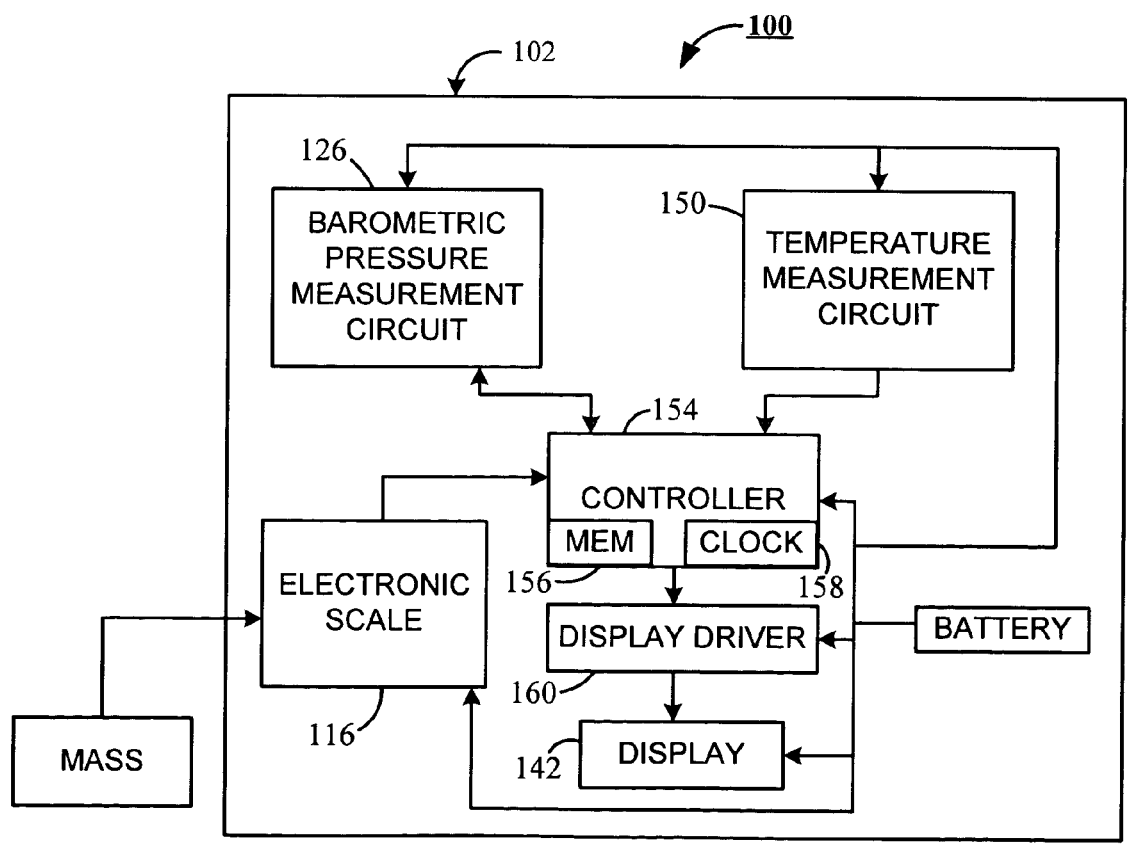
FIG. 7 provides a functional block diagram of a preferred circuit for use with the inventive fishing reel of FIG. 1.

FIGS. 6 and 7 are best viewed in combination. Turning first to FIG. 6, the sensorized fishing reel 100 shown by FIG. 6 further includes: a display 142, for use in visually reporting information pertinent to an angler that may include the weight of a landed fish, barometric pressure readings, or water temperature readings; a display activation switch 144, for use in activating and selecting a data type to be revealed by the display 142; a barometer switch 146, for use in activating the barometric pressure measurement circuit 126 of FIG. 2; and a temperature switch 148, for use in activating a temperature measurement circuit 150 of FIG. 7.

Referring next to FIG. 7. The sensorized fishing reel 100 shows the barometric pressure measurement circuit 126, the temperature measurement circuit 150, and the electronic scale 116 each communicating with a controller 154. The controller 154, includes a memory portion (MEM) 156 and a clock portion 158. FIG. 7 further shows that the controller 154 communicates with a display driver 160, which translates acquired information stored in the MEM 156, and supplies the translation to the display 142. Regarding the barometric pressure measurement circuit 126, a surface mount capacitive silicon absolute pressure sensor, such as the KP120 by Infineon Technologies, AG of Munich, Germany has been found useful as the barometric pressure measurement circuit 126.

Still referring to FIGS. 6 and 7, during operation of the sensorized fishing reel 100, an angler may optionally depress the barometer switch 146 to commence barometric pressure readings. Having depressed the barometer switch 146, the controller 154 signals the barometric pressure measurement circuit 126 to acquire an initial barometric pressure reading. The barometric pressure measurement circuit 126 acquires a current reading of the barometric pressure, and reports the current reading to the controller 154. In a preferred embodiment, the controller 154 stores the current reading of the barometric pressure in the MEM 156 and executes a barometric pressure acquisition routine (not shown separately).

Figure 8:
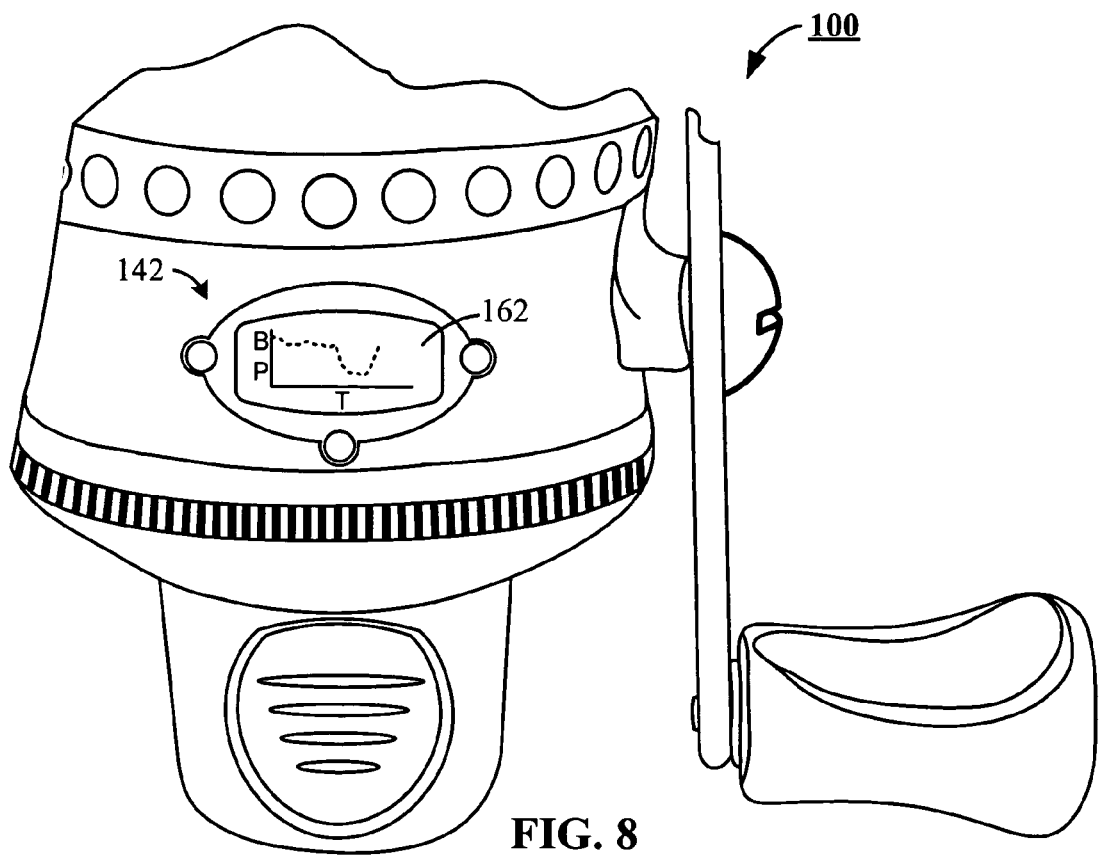
FIG. 8 provides a partial cutaway front side elevational view of the inventive fishing reel of FIG. 1.

Referencing the clock portion 158, the barometric pressure acquisition routine will cause the controller 154 to activate the barometric pressure measurement circuit 126 to acquire an additional barometric pressure reading following a predetermined period of time. That is, a predetermined period of time from the acquisition of the first barometric pressure reading. For example, 15 minutes may be the predetermined period of time. In other words, at each subsequent 15 minute time interval, an additional barometric pressure reading will be made and stored in the MEM 156. Preferably, at anytime following the acquisition of at least two barometric pressure readings, the angler may selectively view either the most recently acquired barometric pressure value reading, or a graphical representation of all of the then acquired barometric pressure readings (as shown by FIG. 8). For example, by depressing the display activation switch 144, a predetermined number of times, the angler may view either the current reading or the graphical representation. In a preferred embodiment, the MEM 156 will store a predetermined number of the most recently acquired barometric pressure readings, for example, the last 20 readings.

Alternatively, after plugging in the thermal-couple input jack 136 of the thermal-couple 134 (each of FIG. 5) into the thermal-couple input receptacle 112 (of FIG. 1) of the sensorized fishing reel 100 the angler may optionally depress the temperature switch 148 to commence temperature readings, preferably of a body of water of interest to the angler. Following depression of the temperature switch 148 by the angler, the controller 154 waits for a signal generated by the thermal probe 140. Upon detection of the signal, the controller 154 translates the signal into a temperature value, and stores the determined temperature in the MEM 156.

Figure 9:
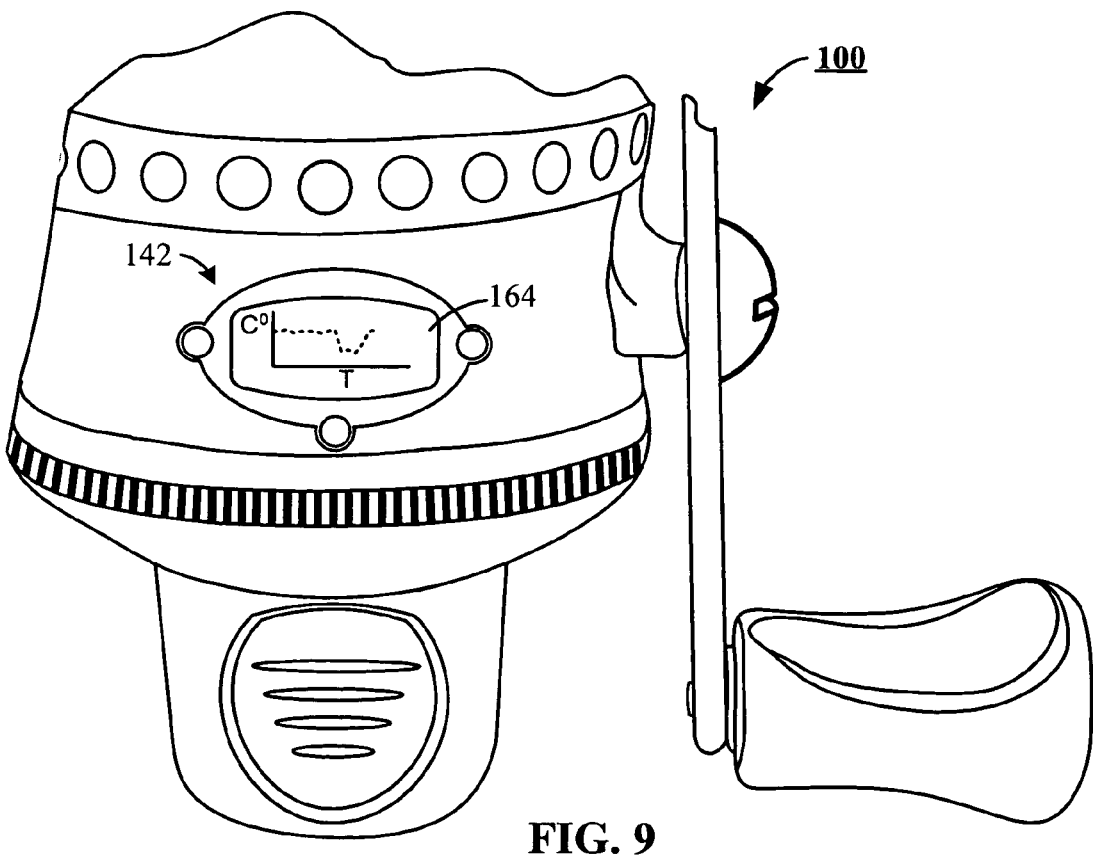
FIG. 9 provides a partial cutaway front side elevational view of the inventive fishing reel of FIG. 1.

Preferably, at anytime following the acquisition of at least two temperature values, the angler may view either the most recently acquired temperature value, or a graphical representation of all temperature values acquired to that point (as shown by FIG. 9). By depressing the display activation switch 144, a predetermined number of times, the angler may view either the current reading or the graphical representation. In a preferred embodiment, the MEM 156 will store a predetermined number of the most recently acquired barometric pressure readings, for example, the last 20 readings. It is noted that, preferably, by depressing the display activation switch 144 a predetermined number of times, the display 142 will query the angler whether the angler wishes to discontinue data collection and shut down the sensory electronics of the sensorized fishing reel 100. If the angler wishes to discontinue data collection the angler may do so by simultaneously pressing the barometer switch 146, and the temperature switch 148. Upon shutting down the sensory electronics of the sensorized fishing reel 100, any data stored in the MEM 156 is erased.

With reference to FIGS. 6, and 7, operation of the electronic scale 116 occurs as follows. Upon landing a fish, the angler suspends the fish from the weight suspension portion (i.e., either: 106 of FIG. 1; 128 of FIG. 3; or 130 of FIG. 4) of the force transfer mechanism 118 of FIG. 2, and depresses the display activation switch 144 a predetermined number of times until the display 142 reveals a message such as, "WEIGH FISH." The landed fish imparts a force on the weight suspension portion (106, 128, 130) preferably in a direction indicated by the force vector 124. The weight suspension portion (106, 128, 130) interacts with the coupling 122, of FIG. 2, of the force transfer mechanism 118. The force transfer mechanism 118 translates the force imparted on the coupling 122 by a suspended landed fish, into an induced force applied in a second direction identified by the force vector 125 of FIG. 2. The force sensor 120 responds to the induced force by generating a voltage output. In a preferred embodiment, the controller 154 determines the weight of the fish based on the voltage level provided by a piezoelectric component of the force sensor 120, i.e., the higher the voltage level—the heavier the fish. In an alternate preferred embodiment, the controller 154 determines the weight of the fish based on the amount of resistance provided by a force sense resistor component of the force sensor 120, i.e., the higher the resistance encountered—the heavier the fish.

Upon determining the weight of the fish, the controller 154 transfers the data to the display driver 160, and preferably the display driver 160 cooperates with the display 142 to provide a viewing of the weight of the fish for the angler, such as shown by FIG. 6. Additionally, the controller 154 further stores the fish weight data in the MEM 156. In a preferred embodiment, fish weight data is stored in a fish history file of the MEM 156. The fish history file tracks the number of fish weighed, the largest fish weighed, the smallest fish weighed, and the average of all fish weighed. Upon removal of the fish from the weight suspension portion (106, 128, 130), the force sensor discontinues generation of the voltage output, and the controller 154 halts execution of the fish weigh portion of the control program, and turns the display 142 off.

Preferably, once at least one fish has been individually weighed, the angler may view the contents of the fish history file by depressing the display activation switch 144 a predetermined number of times until the display 142 reveals a message such as, "FISH WEIGHT DATA." The angler then simultaneously depresses both the barometer switch 146, and the temperature switch 148, which causes the controller 154 to retrieve the data contents of the fish history file, and provide the data to the display 142 for viewing by the angler.

FIG. 8 depicts a proportional graphical representation 162 of barometric pressure readings of a preferred embodiment, provided by the display 142. The data displayed are generated from a plurality of barometric pressure readings, collected over time at a predetermined rate. Preferably, the representation is a proportional graphical representation of the barometric pressure readings, rather than an actual representation of the barometric pressure readings, because knowledge of a change in barometric pressure and the direction of the change in barometric pressure are data of greater use to an angler than is the actual barometric pressure.

FIG. 9 illustrates a proportional graphical representation 164 of water temperature readings of a preferred embodiment, provided by the display 142. The data displayed are generated from a plurality of water temperature readings, collected over time, typically at a random rate. Preferably, the representation is a proportional graphical representation of the water temperature readings, rather than an actual representation of the water temperature readings, because knowledge of a change in the temperature of the water and the direction of the change in water temperature are of at least equal use to an angler as the actual water temperature. For example, the profile of the graphical representation 164 of water temperature readings may aid the angler in identifying location of springs in spring fed lakes, or at what depth fish are likely to be present.

Figure 10:
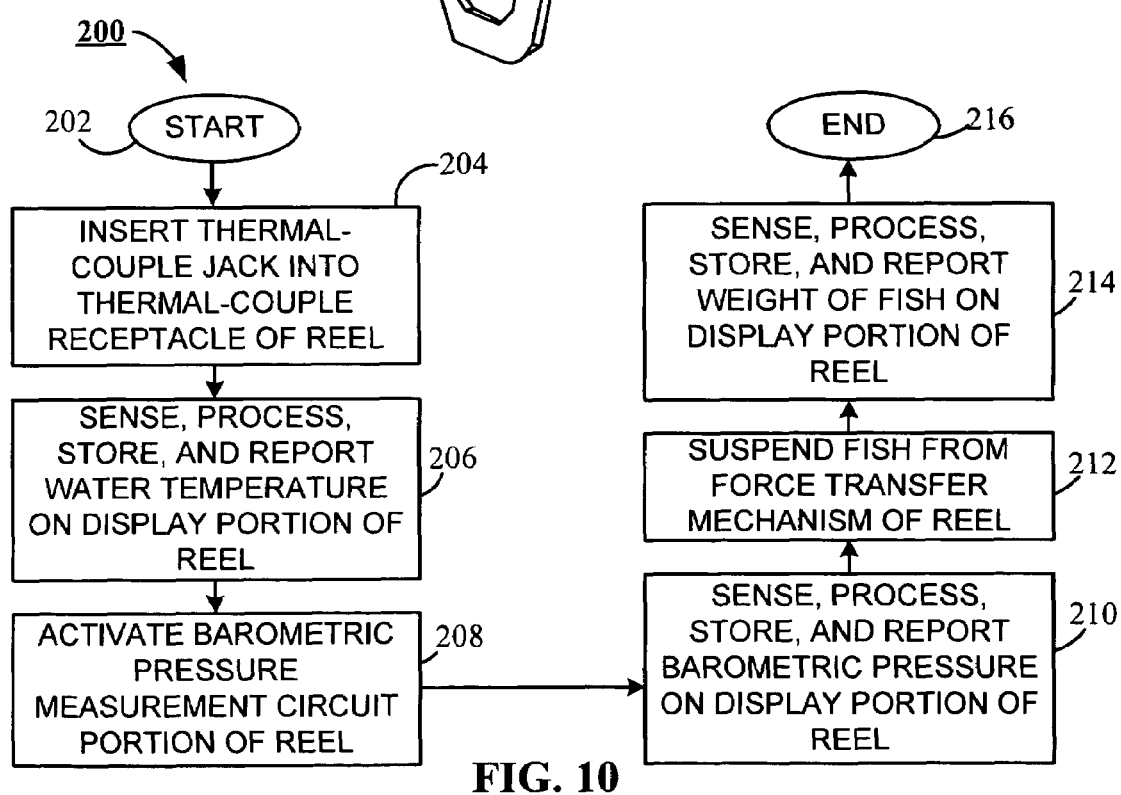
FIG. 10 provides a flow chart of a method of using the inventive fishing reel of FIG. 1.

FIG. 10 depicts a process 200 for using a sensorized fishing reel, such as 100, commences at start process step 202 and proceeds to presses step 204. At process step 204 an angler inserts a thermal-couple jack, such as 136, of a thermal-couple, such as 134, into a thermal-couple receptacle, such as 112, of the sensorized fishing reel. At process step 206, a thermal probe, such as 140, of a thermal-couple is inserted into a body of water of interest to the angler to sense the temperature of the water. The thermal-couple responds to the temperature of the water by sending a signal indicative of the temperature of the water to a controller, such as 154, for processing. The controller: processes the signal by determining a temperature value based on the signal; stores the temperature value in a temperature value table of a memory portion, such as 156, of the controller; and provides the temperature value to a display, such as 142, for viewing by the angler.

At process step 208, the angler depresses a barometer switch, such as 146, to initiate activation of a barometric pressure measurement circuit, such as 126, by the controller. At process step 210, the barometric pressure measurement circuit samples the then current barometric pressure and provides a barometric pressure measurement reading to the controller. The controller: processes the barometric pressure measurement reading by determining a barometric pressure value based on said reading; stores the barometric pressure value in a barometric pressure value table of the memory portion of the controller; and provides the barometric pressure value to the display for viewing by the angler.

Preferably, at process step 212, upon landing a fish, the angler depresses a display activation switch, such as 144, a predetermined number of times until the display reveals a message such as, "WEIGH FISH," and suspends the fish from a weight suspension portion (i.e., either: 106; 128; or 130) of a force transfer mechanism, such as 118. At process step 214, the force transfer mechanism translates the force imparted on the force transfer mechanism by a suspended landed fish, into an induced force applied to a force sensor, such as 120. In a preferred embodiment, the force sensor responds to the induced force by generating a voltage output using a piezoelectric component. The controller determines the weight of the fish based on the voltage level provided by the force sensor. In an alternate preferred embodiment, the force sensor responds to the induced force by generating a change in resistance using a force sense resistor component. The controller determines the weight of the fish based on the change in resistance level provided by the force sensor.

Upon determining the weight of the fish, the controller transfers the data to a display driver, such as 160, and preferably the display driver cooperates with the display to provide a viewing of the weight of the fish for the angler. Additionally, the controller further stores the fish weight data in the memory portion of the controller. Upon removal of the fish from the weight suspension portion, the force sensor discontinues generation of the voltage output, and the controller halts execution of the fish weigh portion of the control program, and turns the display off. The process 200 concludes at end process step 216. It is noted that following process step 214 and prior to end process step 216, the angler may elect to have the sensorized fishing reel show a representation of the temperature value on the display supported by an exterior housing, such as 102, and communicating with the controller; or else elect to have the sensorized fishing reel show a representation of the weight value of the fish on the display; or else elect to have the sensorized fishing reel show a representation of the barometric pressure value on the display.

Thus, the present invention is well adapted to carry out the advantages mentioned above as well as those inherent therein. While presently preferred embodiments have been described for purposes of this disclosure, numerous changes and modifications will be apparent to those skilled in the art. For example, an ability to capture and store species specific best time to fish data relative to a lunar calendar, solar calendar, or both would be a modification, or change of the type apparent to one skilled in the art. Such changes and modifications are encompassed within the spirit of this invention as defined by the appended claims. Furthermore, while the preferred embodiment of the inventive device is described hereinabove and depicted in the accompanying figures as incorporated in a spin cast reel, the invention is not so limited. The inventive device is equally suitable for use in bait cast fishing reels and spinning reels, as well as any other type of reel.

What is claimed is:

1. A sensorized fishing reel comprising, an exterior housing supporting a display and enclosing an electronic scale as well as a controller, in which said electronic scale communicates with said controller to determine a weight of a fish, and wherein said controller communicates with said display to reveal said determined weight of said fish; and further comprising a barometric pressure measuring circuit communicating with said controller and enclosed by said exterior housing, in which said barometric pressure measuring circuit monitors barometric pressure, and wherein said controller acquires barometric pressure readings from said barometric pressure measuring circuit at a predetermined acquisition rate.

2. The sensorized fishing reel of claim 1, in which said controller comprises a memory portion, and wherein a predetermined number of acquired barometric pressure readings are stored in said memory portion of the controller.

3. The sensorized fishing reel of claim 2, in which a numeric value of a most recently acquired barometric pressure reading of the predetermined number of acquired barometric pressure readings is selectively shown on said display.

4. The sensorized fishing reel of claim 2, in which a graphical representation of said predetermined number of acquired barometric pressure readings is selectively shown on said display.

5. The sensorized fishing reel of claim 1, further comprising:
   a temperature measurement circuit enclosed by said exterior housing; and
   a thermal-couple input receptacle communicating with said temperature measurement circuit and supported by said exterior housing.

6. The sensorized fishing reel of claim 5, further comprising an attachable thermal-couple comprising a thermal-couple input jack at a proximal end and a thermal probe at a distal end, wherein said thermal-couple input jack engages said thermal-couple input receptacle, and wherein said thermal probe: senses a temperature of an environment; generates a signal indicative of said temperature of said environment; and provides said signal to said temperature measurement circuit.

7. The sensorized fishing reel of claim 6, in which said temperature measurement circuit interacts with said controller to determine a thermal value based on said generated signal.

8. The sensorized reel of claim 1, in which the electronic scale comprises:
a force sensor enclosed by said exterior housing; and
a force transfer mechanism comprising a weight suspension portion slidingly attached adjacent said exterior housing, wherein said force sensor is responsive to forces encountered by said force transfer mechanism.

9. The sensorized fishing reel of claim 8, in which said force transfer mechanism supports said fish, said fish imparts a force on said force transfer mechanism, said force transfer mechanism transfers said imparted force to said force sensor, and wherein said force sensor cooperating with said controller determines said weight of said fish.

10. A sensorized fishing reel comprising, an exterior housing supporting a display and enclosing an electronic scale as well as a controller, in which said electronic scale communicates with said controller to determine a weight of a fish, and wherein said controller communicates with said display to reveal said determined weight of said fish; and further comprising: a temperature measurement circuit enclosed by said exterior housing; and
a thermal-couple input receptacle communicating with said temperature measurement circuit and supported by said exterior housing;
an attachable thermal-couple comprising a thermal-couple input jack at a proximal end and a thermal probe at a distal end, wherein said thermal-couple input jack engages said thermal-couple input receptacle, and wherein said thermal probe:
senses a temperature of an environment; generates a signal indicative of said temperature of said environment; and
provides said signal to said temperature measurement circuit;
wherein said temperature measurement circuit interacts with said controller to determine a thermal value based on said generated signal; and
wherein said controller comprises a memory portion, wherein said thermal value is stored in said memory portion, and in which a numerical form of said thermal value is selectively shown on said display.

11. The sensorized fishing reel of claim 10, in which the stored thermal value is one of a plurality of stored thermal values, and wherein a graphical representation of the plurality of stored thermal values is selectively provided by said display.

12. A method by steps comprising:
inserting a thermal-couple input jack of a thermal-couple into a thermal-couple receptacle provided by a sensorized fishing reel;
immersing a thermal probe portion of said thermal-couple into a fluid;
generating a signal indicative of a temperature of said fluid with said thermal probe portion;
converting said signal into a temperature value using a controller communicating with said thermal-couple receptacle and confined within an exterior housing of said sensorized fishing reel; and
storing said temperature value in a memory portion of said controller.

13. The method of claim 12, by steps further comprising:
suspending a landed fish from a force transfer mechanism provided by the sensorized fishing reel;
imparting a force on the force transfer mechanism by way of said suspended fish;
transferring the force imported on the force transfer mechanism by the suspended fish to a sensor enclosed by said exterior housing;
generating a signal indicative of an amount of force encountered by said force transfer mechanism by way of said suspended fish;
determining a weight value of said fish based on said signal using said controller, wherein said controller communicates with said force sensor; and
storing said determined weight value in said memory portion of said controller.

14. The method of claim 13, by steps further comprising:
activating a barometric pressure measurement circuit;
sampling a then current barometric pressure;
generating a signal with said barometric measurement circuit substantially indicative of said then current barometric pressure sample;
determining a current barometric pressure value corresponding to said generated signal using said controller, wherein said controller interacts with said barometric measurement circuit;
storing said current barometric pressure value in said memory portion of said controller; and
deactivating said barometric pressure measurement circuit.

15. The method of claim 14, by steps further comprising:
waiting a predetermined period of time;
automatically reactivating said barometric pressure measurement circuit;
acquiring an additional barometric pressure sample;
generating a second signal with said barometric measurement circuit substantially indicative of said additional acquired barometric pressure sample;
determining an additional barometric pressure value corresponding to said generated second signal using said controller;
storing said additional barometric pressure value in said memory portion of said controller; and
deactivating said barometric pressure measurement circuit.

16. The method of claim 15, by steps comprising:
showing a representation of said temperature value of said fluid on a display supported by said exterior housing and communicating with said controller; else
showing a representation of said weight value of said fish on said display; else
showing a representation of said barometric pressure value on said display.

* * * * *